(12) United States Patent
Subramanian et al.

(10) Patent No.: US 7,086,006 B2
(45) Date of Patent: Aug. 1, 2006

(54) COMPONENT USER INTERFACE MANAGEMENT

(75) Inventors: Ramesh Subramanian, Gloucester (CA); Luc Foley, Gatineau (CA); Stephen Mereu, Orleans (CA)

(73) Assignee: Corel Corporation (CA)

( * ) Notice: Subject to any disclaimer, the term of this patent is extended or adjusted under 35 U.S.C. 154(b) by 467 days.

(21) Appl. No.: 10/039,486

(22) Filed: Nov. 9, 2001

(65) Prior Publication Data

US 2003/0090519 A1 May 15, 2003

(51) Int. Cl.
*G06F 3/00* (2006.01)

(52) U.S. Cl. ............... 715/747; 715/746; 715/762
(58) Field of Classification Search ........... 345/746, 345/762, 747; 715/746, 747, 762
See application file for complete search history.

(56) References Cited

U.S. PATENT DOCUMENTS

| | | | |
|---|---|---|---|
| 5,533,184 A | 7/1996 | Malcolm | 395/161 |
| 5,596,702 A | 1/1997 | Stucka et al. | 395/340 |
| 5,673,401 A | 9/1997 | Volk et al. | 395/327 |
| 5,760,776 A | 6/1998 | McGurrin et al. | 345/353 |
| 5,815,148 A | 9/1998 | Tanaka | 345/335 |
| 5,845,128 A | 12/1998 | Noble et al. | 395/712 |
| 5,897,670 A | 4/1999 | Nielsen | 345/334 |
| 5,950,001 A | 9/1999 | Hamilton et al. | 395/701 |
| 5,959,624 A | 9/1999 | Johnston, Jr. et al. | 345/334 |
| 6,025,849 A | 2/2000 | Felser et al. | 345/441 |
| 6,040,832 A * | 3/2000 | Poreh et al. | 345/781 |
| 6,230,309 B1 | 5/2001 | Turner et al. | 717/1 |
| 6,253,282 B1 | 6/2001 | Gish | 711/113 |
| 6,289,382 B1 | 9/2001 | Bowman-Amuah | 709/226 |
| 6,310,632 B1 * | 10/2001 | Monroe et al. | 345/808 |
| 6,498,612 B1 * | 12/2002 | Brown et al. | 345/762 |
| 6,675,230 B1 * | 1/2004 | Lewallen | 719/328 |

* cited by examiner

*Primary Examiner*—Raymond J. Bayerl
*Assistant Examiner*—Dennis G. Bonshock
(74) *Attorney, Agent, or Firm*—Hayes Soloway P.C.

(57) ABSTRACT

A user interface framework management system for managing the user interface of a software application is provided. The user interface framework management comprises a merged application user interface for receiving a software application user interface element of the software application and a component user interface element of a component to be included with the software application, a unification unit for merging the component user interface element with the software user interface element into the merged application user interface, and an identification unit for associating the component with the component user interface element in the merged application user interface.

22 Claims, 12 Drawing Sheets

COMPONENT USER INTERFACE MANAGEMENT

FIELD OF THE INVENTION

The invention relates to user interface components of software applications. In particular, the invention relates to a system and method for a user interface framework manager.

BACKGROUND OF THE INVENTION

Historically, software applications (applications) are shipped with a predefined set of tools. For example, in Corel (TM) Photopaint (TM) There is a brush tool, an eraser tool a mask tool, etc. With the increase in the use and capability of the Internet, application models have changed. Rather than shipping an application with a fixed set of tools, users can now download new tools (or components) which attach themselves to die application to augment its feature set.

This flexibility means that multiple configurations of the application can be shipped with different tool components to meet varying sales markets. It also means that users can buy an inexpensive version of the product with few tool components and then grow their tool set by selectively buying the ones for their particular needs. Trial tool components are also possible for uses to demo but will time-out after a set time if the user does not decide to purchase it.

Each component can bring with it a whole set of user interface (UI) items, toolbars, menus, dockers and shortcut keys that the application user interface framework must be able to recognize and seamlessly integrate into its current layout when the component is loaded. On top of this, any particular application user interface, or workspace can be shared with fellow users and this sharing must account for the possibility that a particular component may not be registered on the new user system.

Currently there are a number of architectures by different vendors that support components which add their own user interface items to the application. None of these, however, provide a complete, customizable UI component system that is managed at the application framework level. These known architectures require each component to manage the portions they add themselves.

Problems associated with the current art may be divided into two groups, i) the component UI is treated differently than the application UI; and ii) component UI problem when loading or unloading components, and missing components. The following are a number of component UI problems that exist with the current architectures:

i) Component UI is treated differently than application UI:
  1) Some architectures only allow components to add toolbar buttons or menu items and do not allow more complex UI elements like combo boxes, edit controls, sliders, shortcut keys, shortcut key tables, toolbars, menus, dockers, etc. This is a problem since it limits the component to what it can add to the application. Many components need to have more complicated user interface controls other than buttons. For example, a bitmap transparency component could use a slider control on a toolbar to allow the user to adjust the transparency value.
  2) Some architectures do not allow the user to customize all of the individual component UI elements such as an item location, caption text, tooltip text bitmap, item size, shortcut key, toolbars, menus, dockers, etc. This is a problem since not only does it limit the user from fully customizing the user interface it limits other third party developers from creating custom solutions for clients.
  3) Some architectures treat component UI with a different status than the regular application UI by not allowing the component UI to add itself anywhere into the application UI. The component UI is restricted to one location in a menu or toolbar. This is a problem since it fragments the UI rather than merging it seamlessly together.

ii) Component UI problems when loading or unloading components, and missing components:
  4) Some architectures can only add or remove component UI by shutting down the application and restoring. This is a real inconvenience to the user and gives the application an unprofessional impression to the user.
  5) Some architectures allow components to add their UI but do not remove the UI when the component is unloaded. Instead the UI remains visible for the user to select and then brings up a dialog box saying that this feature is not available. If the UI is to be removed it is left up to the individual component to do so. Leaving UI from unloaded components gives the application a cluttered and unprofessional impression to the user.
  6) Some architectures can remove the component UI items when the component is removed but do not remove any that were customized by the user. For example, if the user copied a component button to a different toolbar, the copied button will not be removed when the component is unloaded. If the user selects it, the feature is not available. These architectures leave it up to the component to specifically search for these customizations and remove them. This too leaves the application cluttered and gives it an unprofessional impression to the user.
  7) Architectures that rely on the unloading components to remove all of their UI and any user customizations also rely on the components to restore those customization if they are later reloaded. Leaving this up to each of the components puts a great burden on them and they are not all likely to do it right. If any of them do not do it properly it will confuse the user due to the inconsistent behaviour between various components.
  8) Some architectures allow users to shame their UI with fellow users. If the UI happens to contain UI elements from a component that the new user does not have loaded, the UI does not disappear but is visible for The user to select. Again, this is a problem since the UI is visible but the feature is not available. This gives the application an unprofessional impression to the user.

The following is a list of current component architectures as well as a note to where each one fails to solve the component UI problems:
  1) Bitmap plugins do not solve problems 1, 2, 3, and 4 listed above.
  2) Addins do not solve problems 1, 2, and 4 listed above.
  3) VBA Object Models do not solve problems 5, 6, 7, and 8 listed above.
  4) WordPerfect (TM) $3^{rd}$ Party Handlers do not solve problems 1, 6, and 8 listed above.

There is a need for an architecture that solves the above listed problems.

SUMMARY OF THE INVENTION

The invention described in this document solves many of the above listed problems at the application framework level to support customizable component user interface (UI) that are merged seamlessly into the application UI. The invented architecture knows when the component is available and remember all customizations even when it is not there so that when the component is re-added the customizations are restored.

In accordance with an aspect of the invention, there is provided a user interface framework management system for managing the user interface of a software application. The user interface framework management comprises a merged application user interface for receiving a software application user interface element of the software application and a component user interface element of a component to be included with the software application, a unification unit for merging the component user interface element with the software user interface element into the merged application user interface, and an identification unit for associating the component with the component user interface element in the merged application user interface.

In accordance with another aspect of the invention, there is provided a method for managing the user interface framework of a software application when installing a component in a software application. The method comprises steps of receiving a software application user interface element of the software application and a component user interface element of the component in a merged application user interface, merging the component user interface element with the software user interface element into the merged application user interface, and associating the component with the component user interface element in the merged application user interface.

In accordance with another aspect of the invention, there is provided a method for managing the user interface framework of a software application when unloading a component from a software application. The method comprises steps of receiving a software application user interface element of the software application and a component user interface element of the component in a merged application user interface, the component being associated with the component user interface element, and disassociating the component from the component user interface element in the merged application user interface.

In accordance with another aspect of the invention, there is provided a method for managing the user interface framework of a software application when reloading a component from a software application. The method comprises steps of receiving a software application user interface element of the software application and a component user interface element of the component in a merged application user interface, the component being disassociated with the component user interface element, and re-associating the component from the component user interface element in the merged application user interface.

In accordance with another aspect of the invention, there is provided a computer data signal embodied in a carrier wave and representing sequences of instructions which, when executed by a processor, cause the processor to perform a method for managing the user interface framework of a software application when installing a component in a software application. The method comprises steps of receiving a software application user interface element of the software application and a component user interface element of the component in a merged application user interface, merging the component user interface element with the software user interface element into the merged application user interface, and associating the component with the component user interface element in the merged application user interface.

In accordance with another aspect of the invention, there is provided computer-readable media for storing instructions or statements for use in the execution in a computer of a method for managing the user interface framework of a software application when installing a component in a software application. The method comprises steps of receiving a software application user interface element of the software application and a component user interface element of the component in a merged application user interface, merging the component user interface element with the software user interface element into the merged application user interface, and associating the component with the component user interface element in the merged application user interface.

In accordance with another aspect of the invention, there is provided a computer program product for use in the execution in a computer for creating a user interface framework management system for managing the user interface of a software application. The user interface framework management comprises a merged application user interface for receiving a software application user interface element of the software application and a component user interface element of a component to be included with the software application, a unification unit for merging the component user interface element with the software user interface element into the merged application user interface, and an identification unit for associating the component with the component user interface element in the merged application user interface.

DETAILED DESCRIPTION OF EMBODIMENTS OF THE INVENTION

Figure 1:
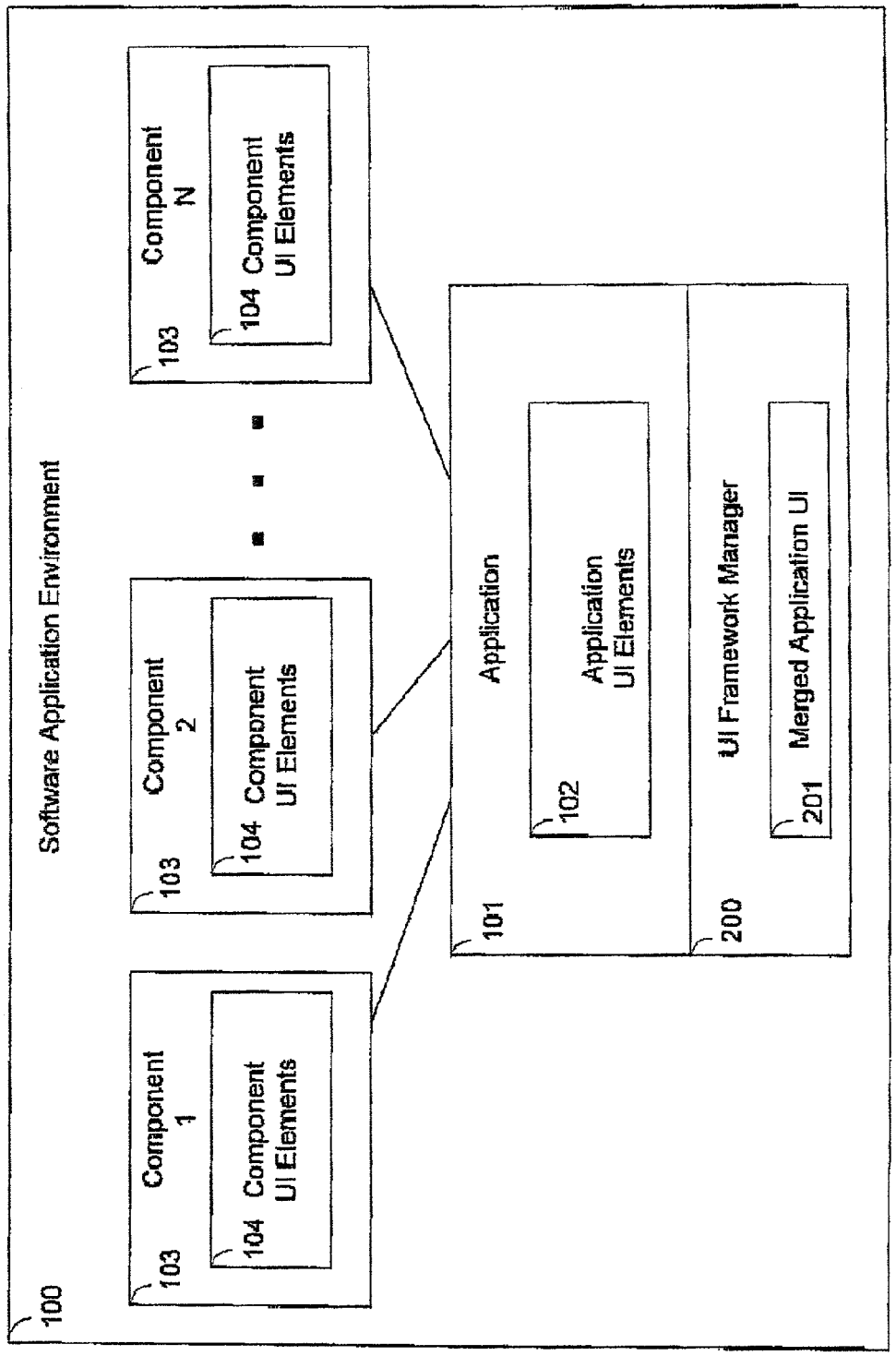
FIG. 1 is a diagram showing an example of a software application environment.

FIG. 1 shows an example of a software application environment 100. The environment includes an application 101, components 103, and a user interface (UI) framework manager 200. The application 101 contains application UI elements 102. Far example, each toolbar, menu, docker, button, slider, etc., are UI elements. Each component 103 contains component UI elements 104. The UI framework manager 200 contains a merged application UI 201.

The application 101 is built on top of the UI framework manager 200 which manages the component UI elements 104 and the application UI elements 102. When a component 103 submits its UI elements 104 to the application 101, the application 101 in turn gives the component UI elements 104 to the UI framework manager 200 to handle. Another way is for the component 103 to submit its component UI elements 104 directly to the UI framework manager 200.

In one embodiment of the invention, individual components 103 are loaded into the application 101. Once loaded they submit their user interface elements 104 and the application 101 uses a UI framework manager 200 to manage them (see FIG. 1), This UI framework manager 200 is responsible for coordinating the UI elements that come from either the application 101 or the individual components 103.

Figure 2:
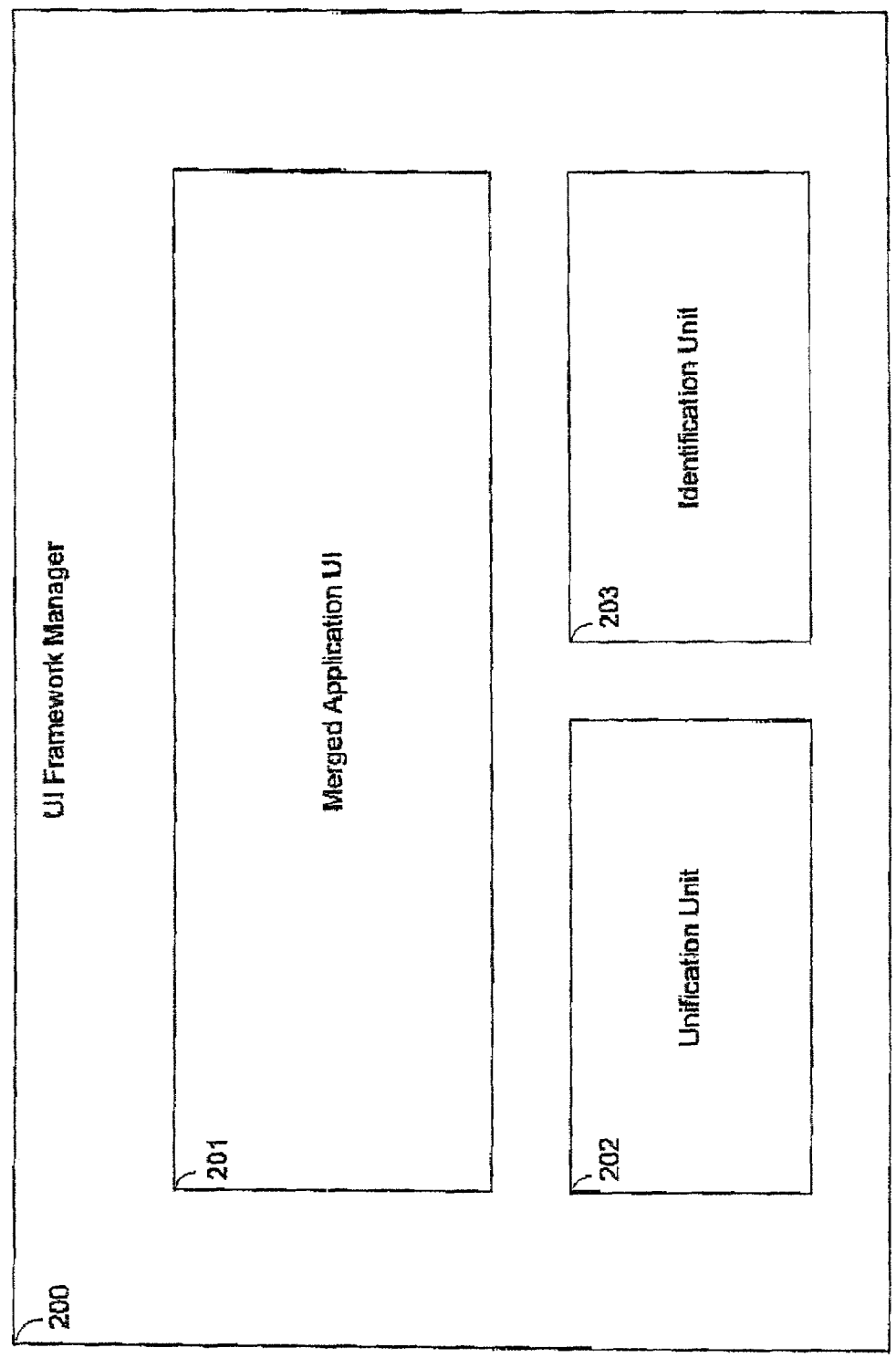
FIG. 2 is a diagram showing an example of a user interface framework manager.

FIG. 2 shows a UI framework manager 200 comprising a merged application UI 201, a unification unit 202 and an identification unit 203. Through its unification unit 202, the UI framework manager 200 take The component UI elements 103 along with the application UI elements 102 and unites them together to form a seamless application UI, i.e., merged application UI 201, for the user. Component UI elements like buttons, sliders, drop down lists, etc may be added to existing application toolbars, menu, etc. Or the component may add its own toolbars, menus, etc. which will be placed in the UI just like regular application toolbars, menus, etc. Once a component 103 has added its component UI elements 104 to the application 101, the component UI elements 104 are not segregated and given special status. Instead, the component UI elements 104 becomes an equal part of the merged application UI 201.

Since there is one central UI framework manager 200, any UI feature available to the application 101 is also available to each of the loaded components 103. This is possible since the framework manager can fully manage all the UI elements no matter what type they are or where they originated from. This means that a component's UI element 104 could include any type of UI element, such as drop down lists, edit controls, slider, shortcut keys, shortcut key tables, toolbars, menus, dockers, etc., and is not limited to only toolbar buttons or menu items. This solves the first component UI problem listed above. Furthermore, added components are no longer limited to just adding buttons but can add the same type of UI as the application can add. Previous architectures that fail to solve component UI problem one, cannot provide support for this flexibility.

As already mentioned the UI elements, whether from the application 101 or from a component 103, are treated the same. This means that the component UI elements 104 may be placed anywhere in the application UI 201, and are not restricted to particular menus or toolbars. The UI framework manager 200 supports this flexibility by allowing individual UI elements, from both the components 103 and the application 101, to specify on which toolbar, menus, etc., they should be placed. Component UI elements 104 may also be fully customized by the user just like the regular application UI elements 102. Once The UI elements have been merged into the merged application UI 201 there is no longer a division between component UI elements 104 and application UI elements 102. The UI framework manager 200 allows each element to be fully customized including changing its label, bitmap, shortcut key, location, tooltip, etc. This solves the second and third component UI problems listed above.

Since the UI framework manager 200 treats the components UI elements 104 and the application UI elements 102 the same way, the first three component UI problems listed above have been solved. However, it is also desirable for the UI framework manager 200 to be able to distinguish between the components so that it may manage component loading, unloading, and UI sharing, as well as managing missing components.

To do this, the UI framework manager 200 assigns ownership to each of the added component UI elements 104, through its identification unit 203 when the UI elements are merged into the merged application UI 201. That is, every button, drop down list, toolbar, menu, etc. is given a tag that identifies which component 103 added it to the merged application UI 201. This component 103 is then considered to be the owner of that UI element in the merged application UI 201. The idea of ownership solves component UI problems four through eight listed above. This solution is further described below.

When a component 103 is loaded into the application 101, the component 103 submits its component UI elements 104 to the application 101. The application 101 gives the component UI elements 104 to the UI framework manager 200. The UI framework manager 200 assigns the owner identification to the component UI elements 104 that are added to the merged application UI 201. It will also assign the owner identification to the application UI elements that are added to the merged application UI 201. If the component 103 is later unloaded, the UI framework manager 200 searches through the merged UI elements 201 and removes any that are owned by that component 103. This allows components 103 to be dynamically loaded and unloaded while the application 101 is running. The application does not need to be restarted since the unloaded component's UI elements that were apart of the merged application UI 201 are now removed. Similarly when a component 103 is added to a running application, the UI framework manager 200 merges the component's UI elements 104 into the merged application UI 201. The application does not need to be resarted. In addition, since the UI framework manager 200 searches for the unloaded component's UI in the merged application UI 201 to remove them, it also means that the component UI elements 104 that a component 103 added, including those that a user has customized with different properties and different locations, will also be removed when the component 103 is unloaded. This solves component UI problems four, five and six listed above.

Although unloaded component UI elements 104 are invisible to the user, they are not completely removed. The UI framework manager 200 hides all component UI elements in the merged application UI 201 that are identified with an unloaded component 103 from being accessed, but keeps the customizations internally for future use. If the component 103 is later reloaded, its component UI elements in the merged application UI 201, including any customizations, will automatically be restored. This solves component UI problem number seven listed above.

If one user, who had a particular component 103 loaded, shared their application UI 102 setup and all its customizations with another user, that other user would only see the component UI elements in their merged application UI 201 for which there was support. That is, if the new user did not have a particular component 103, its component UI elements 104 specified in the shared, merged application UI elements 201 would not be visible or accessible. The UI framework manager 200 accomplishes this by checking if each UI element in the merged application UI 201 may be created by its owner component 103 or application 101. In this example, the UI elements in the merged application UI 201 from the missing component may not be created since the component is not loaded. If, however, that user later loaded the missing component 103, the component UI elements 104 would appear in the manner that the original user had customized it. This is possible since the UI framework manager 200 maintains all the customizations that were made to items even if they can not be shown. Once the owning component 103 is loaded, the UI framework manager 200 will then use these stored customizations and show the UI exactly how the first user had them. This solves component UI problem number eight listed above.

Figure 3:
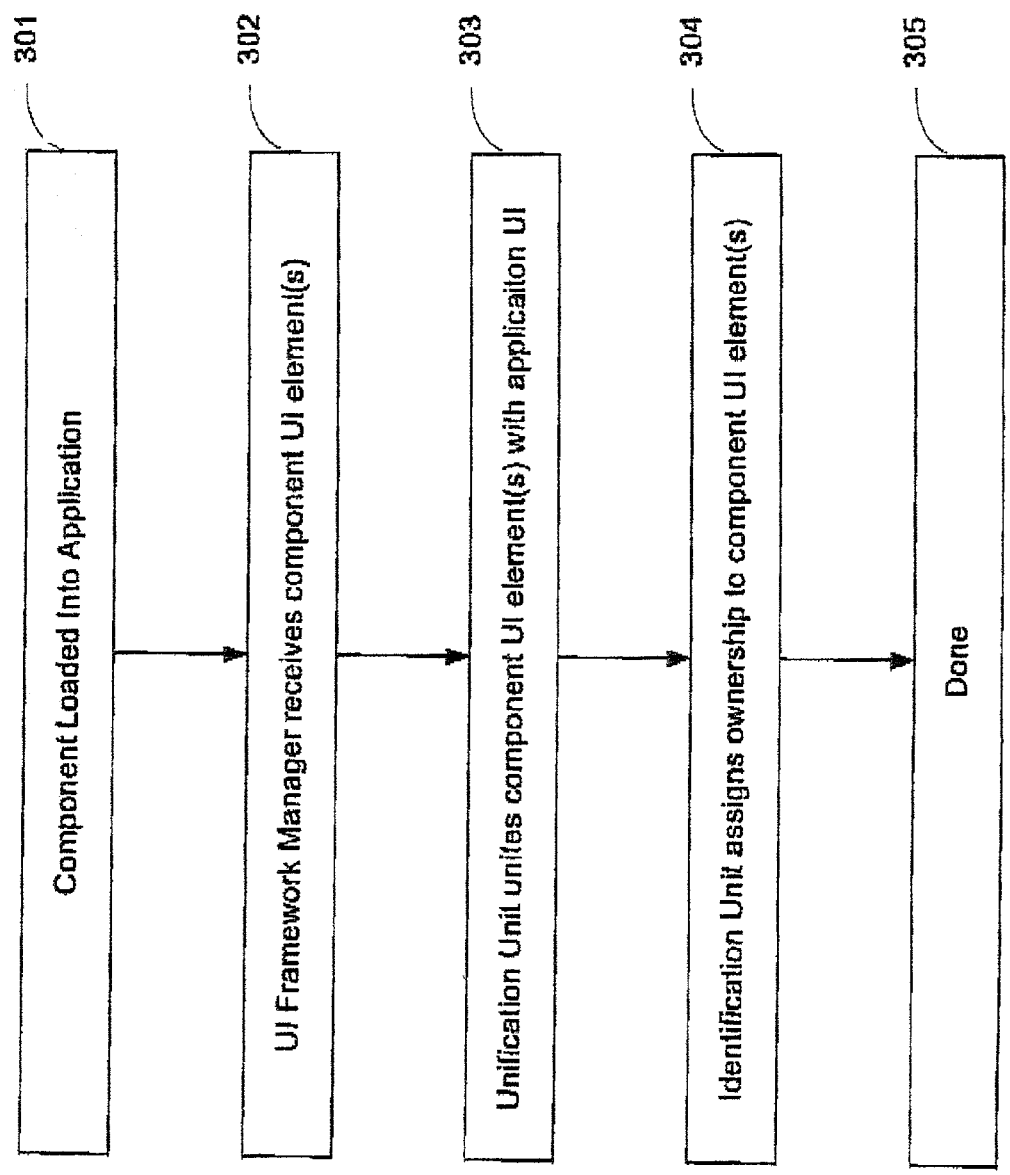
FIG. 3 is a flow chart showing an example of the operation of a user interface framework manager when loading a component to an application.

FIG. 3 shows a flowchart of the installation of a new component 103. When a component 103 is installed into the application 101, the application 101 receives the component UI elements 104 (301). The application 101 passes the component UI elements 104 to the UI framework manager 200 (302). The unification unit 202 of the UI framework manager 200 unites the component UI elements 104 with the application UI elements 102 into a merged UI 201 (303). Next, the identification unit 203 of the UI framework manager 200 assigns ownership to the component UI elements 104 in the merged application UI 201 to the component 103 (304). The component 103 is now added to the application 101 (305).

Figure 4:
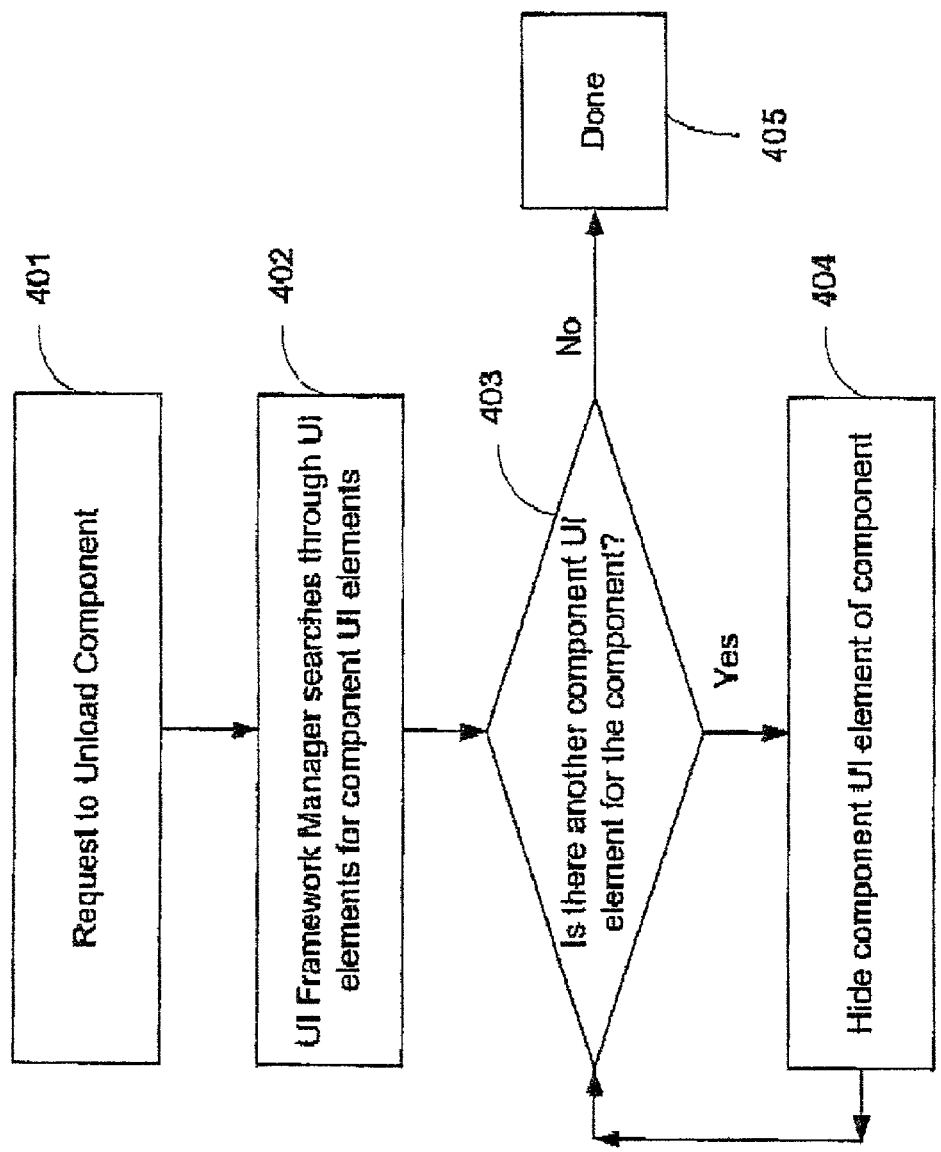
FIG. 4 is a flow chart showing an example of the operation of a user interface framework manager when loading a component from an application.

FIG. 4 shows a flowchart of the request to remove a component 103 from the application 101. Once a request to unload the component 103 is made, the UI framework manager 200 searches through the merged application UI 201 for component UI elements 104 that have been assigned ownership to the component 103 (402). The UI framework manager 200 hides each component UI element 104 owned by the component 103 (403). The component 103 is now unloaded from the application 101 (405).

Figure 5:
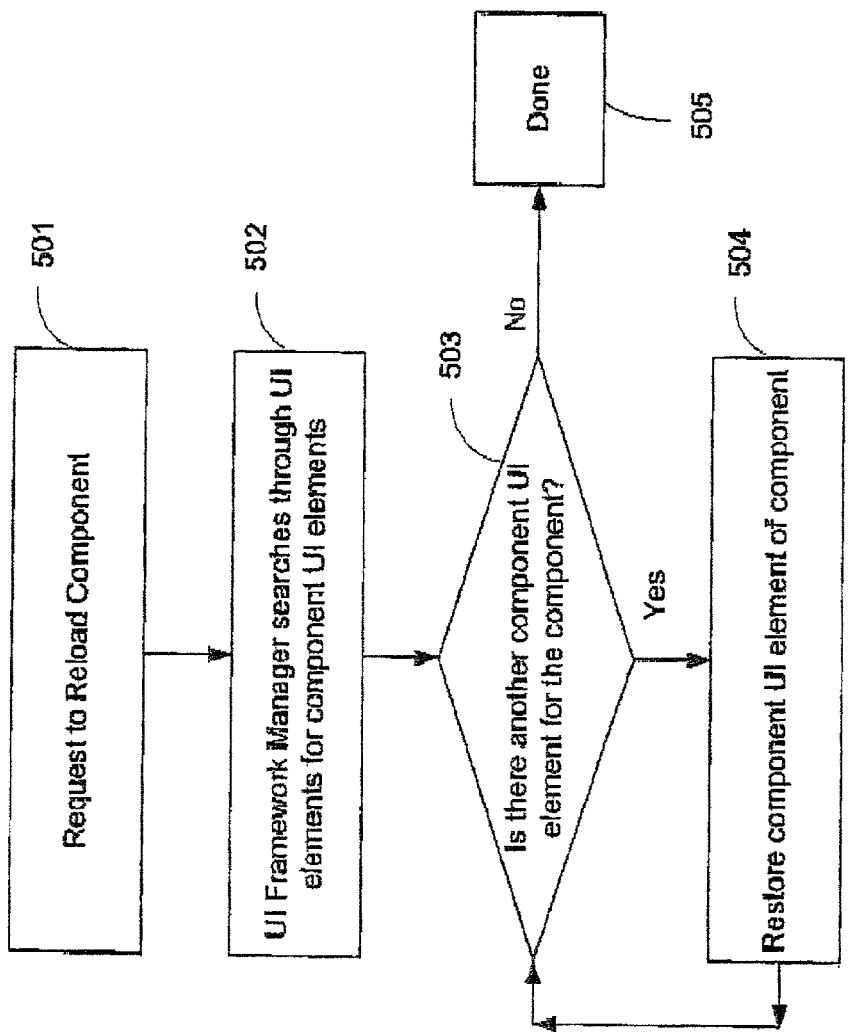
FIG. 5 is a flow chart showing an example of the operation of a user interface framework manager when reloading a component from an application.

FIG. 5 shows a flowchart of the request to reload a component 103 previously removed from the application 101. Once a request to reload the component 103 is made, the UI framework manager 200 searches through the merged application UI 201 for hidden component UI elements 104 that are assigned ownership to the component 103 (502). The UI framework manager 200 restores each component UI element 104 hidden from the application 101 (504). The component 103 is now reloaded into the application 101 (505).

Figure 6:
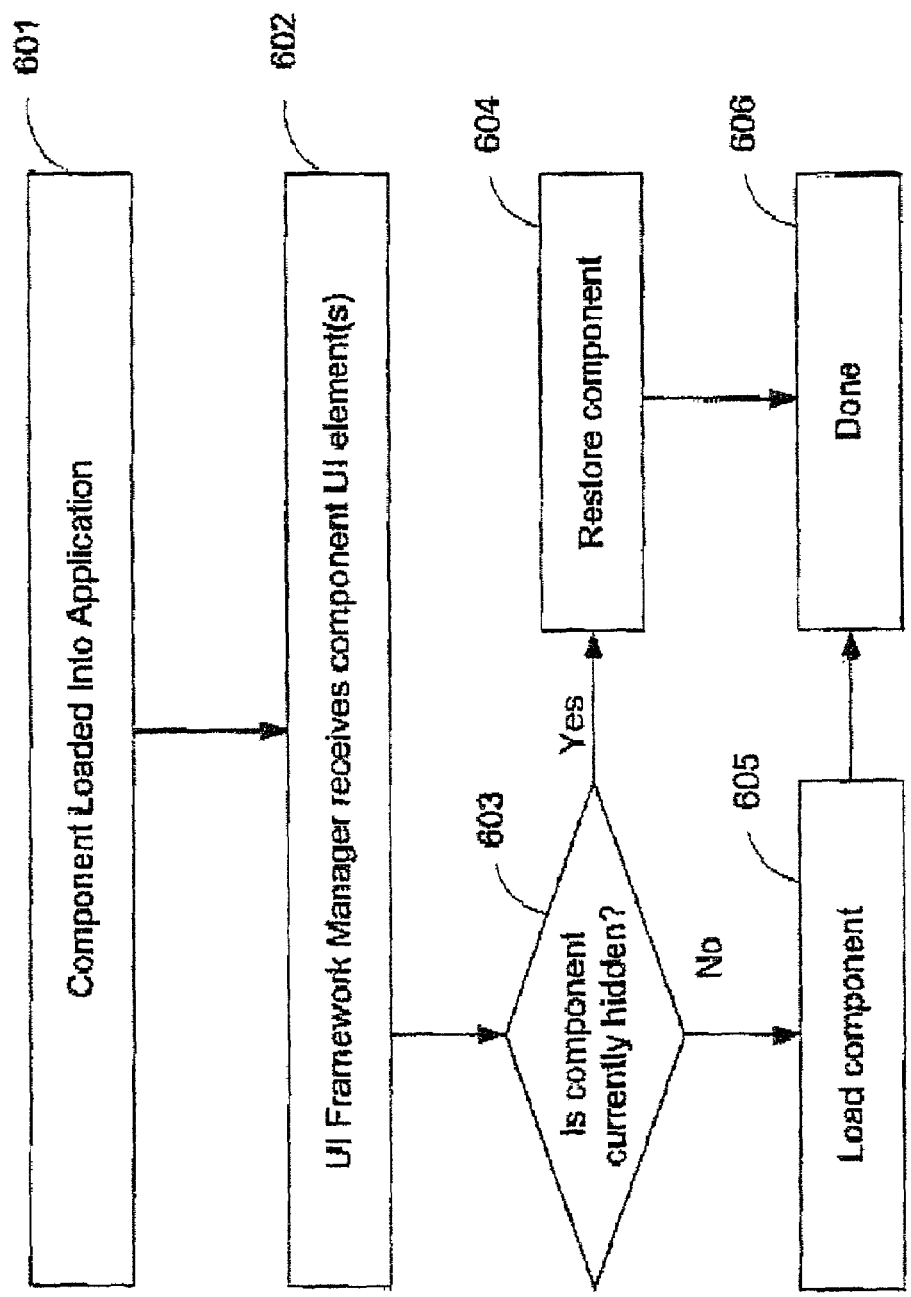
FIG. 6 is another flow chart showing a example of the operation of a user interface framework manager when loading a component to an application.

FIG. 6 shows another flowchart of the installation of a component 103. When a component 103 is installed into the application 101, the application 101 receives the component UI elements 104 (601). The application 101 passes the component UI elements 104 to the UI framework manager 200 (602). The UI framework manager 200 first searches to see if the component 103 is being hidden (603). If so, then the UI framework manager 200 restores the component 103 (604) as described above in FIG. 5, Otherwise, the component 103 is loaded as described above in FIG. 3 by submitting its component UI elements 104 To the UI framework manager 200 (605).

FIGS. 7 through 12 are screen shots showing an example of a FrmWkTest program 700 which is a sample test application with two tool components: the ellipse 701 and the rectangle 703. Both components add one button to the toolbox on the left side when they are loaded. The figures demonstrate the seamlessness of component UI elements 104 in the application with respect to loading and unloading components 103, customization and missing components.

Figure 7:
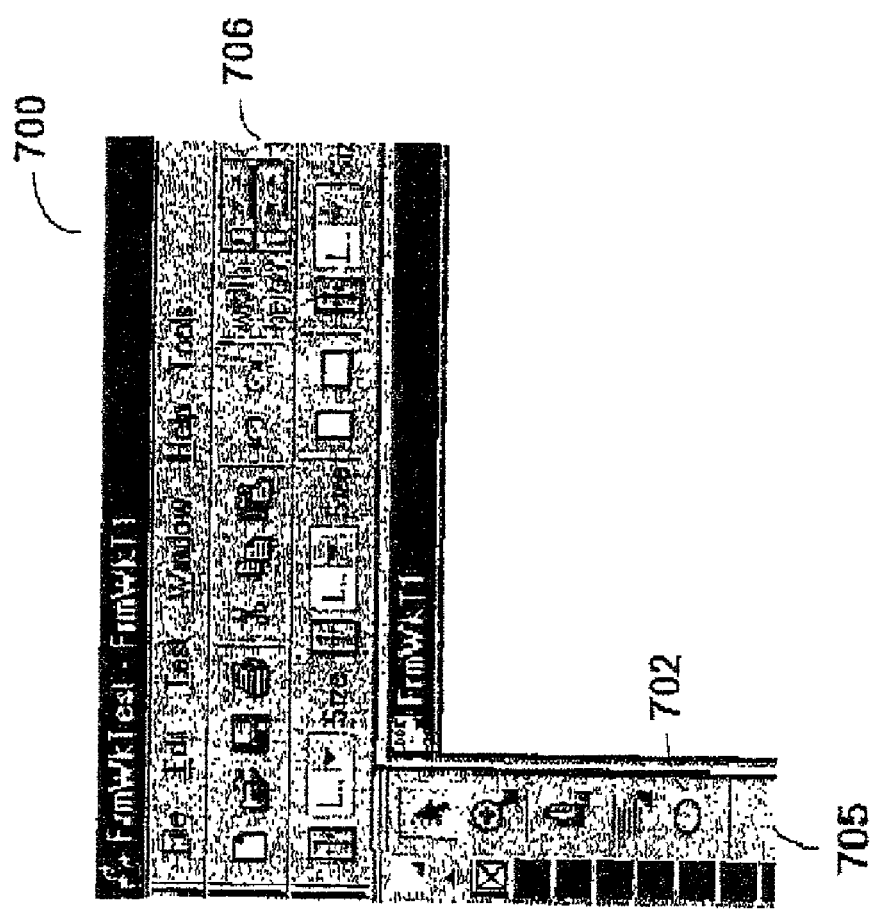
FIG. 7 is a partial screen shot showing a component added to an application
Figure 8:
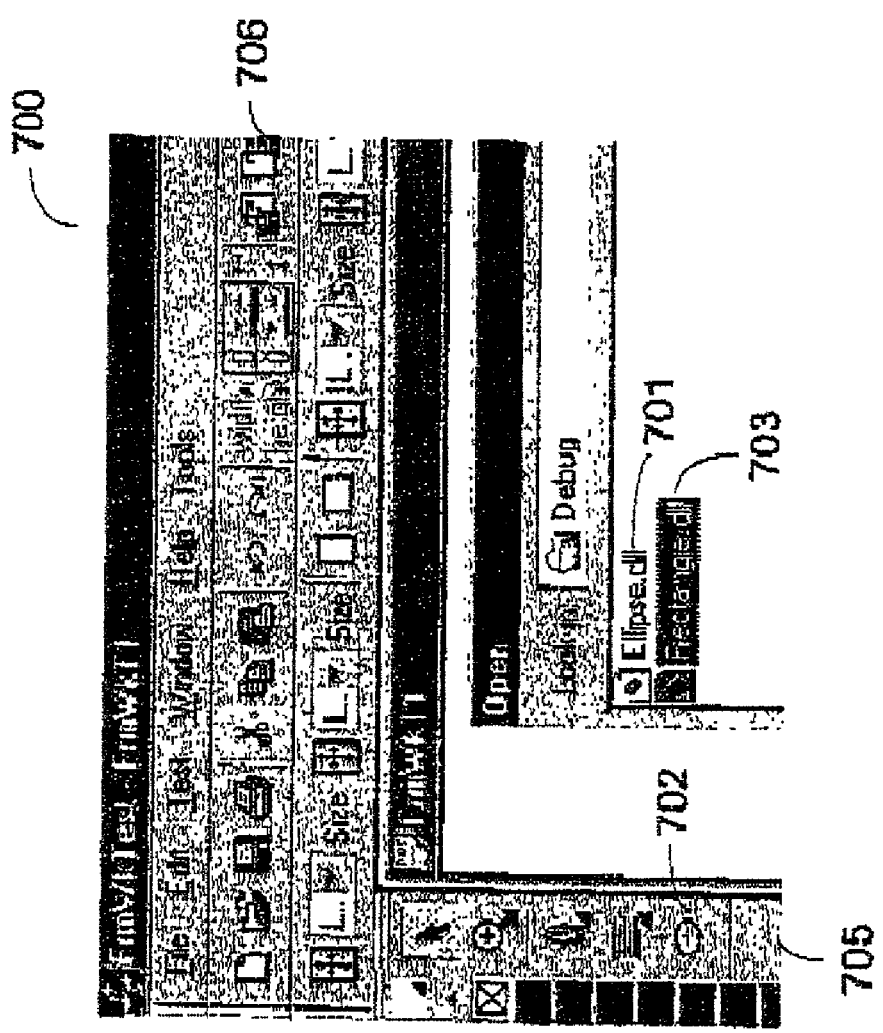
FIG. 8 is a partial screen shot showing another component being added to an application.
Figure 9:
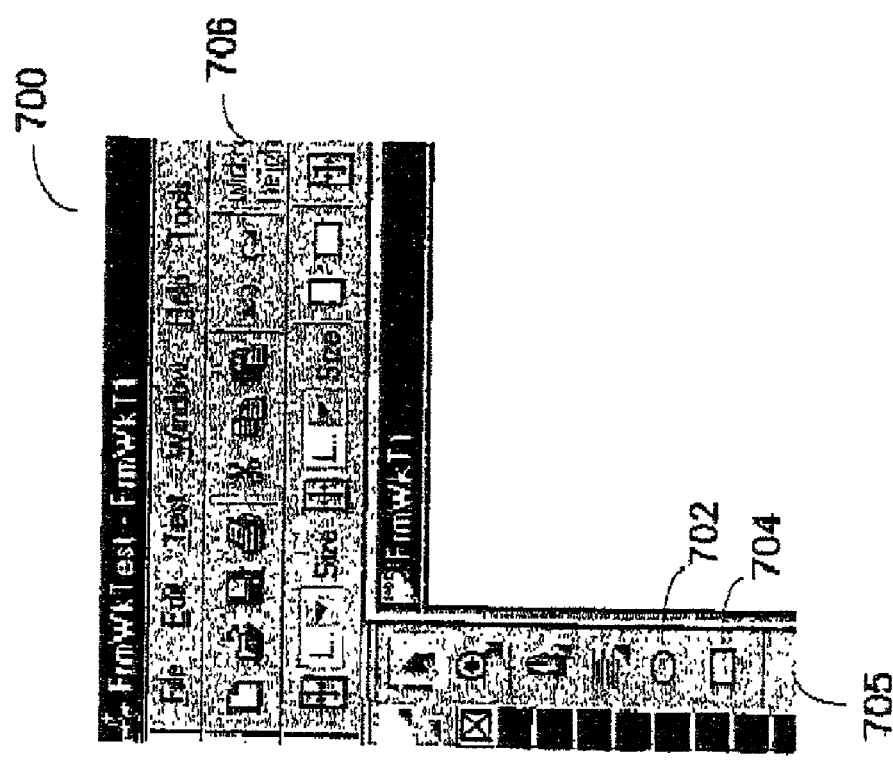
FIG. 9 is a partial screen shot showing two components added to an application.
Figure 10:
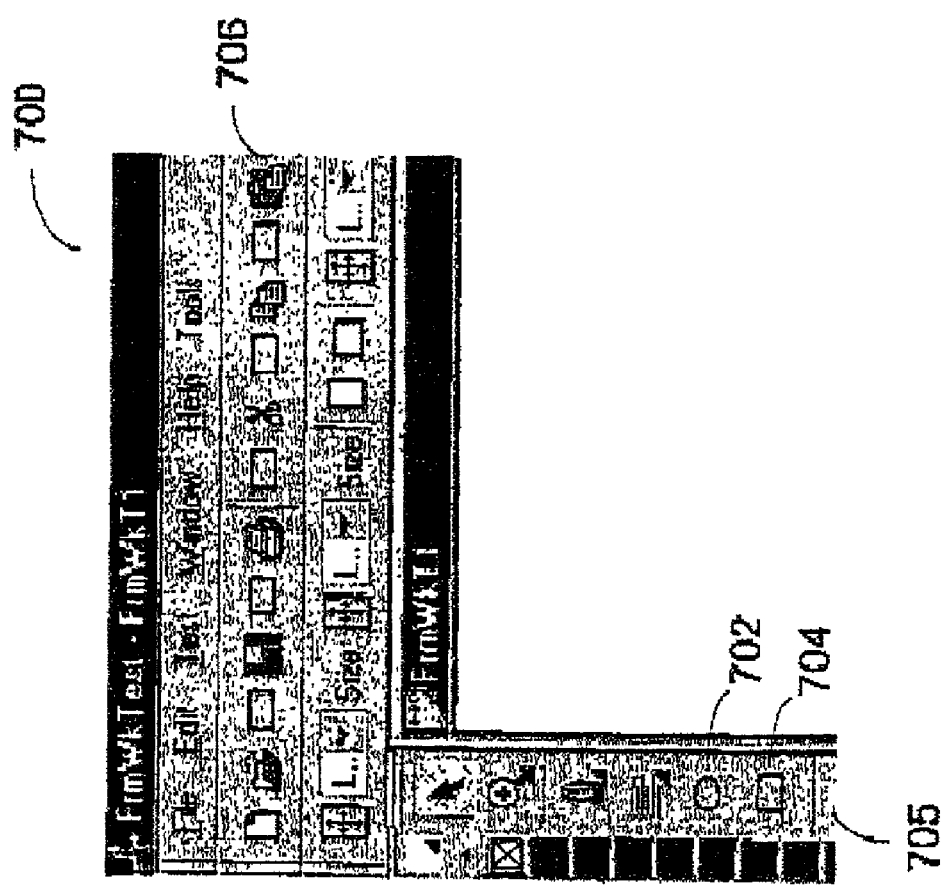
FIG. 10 is a partial screen shot sowing a customized component to an application.
Figure 11:
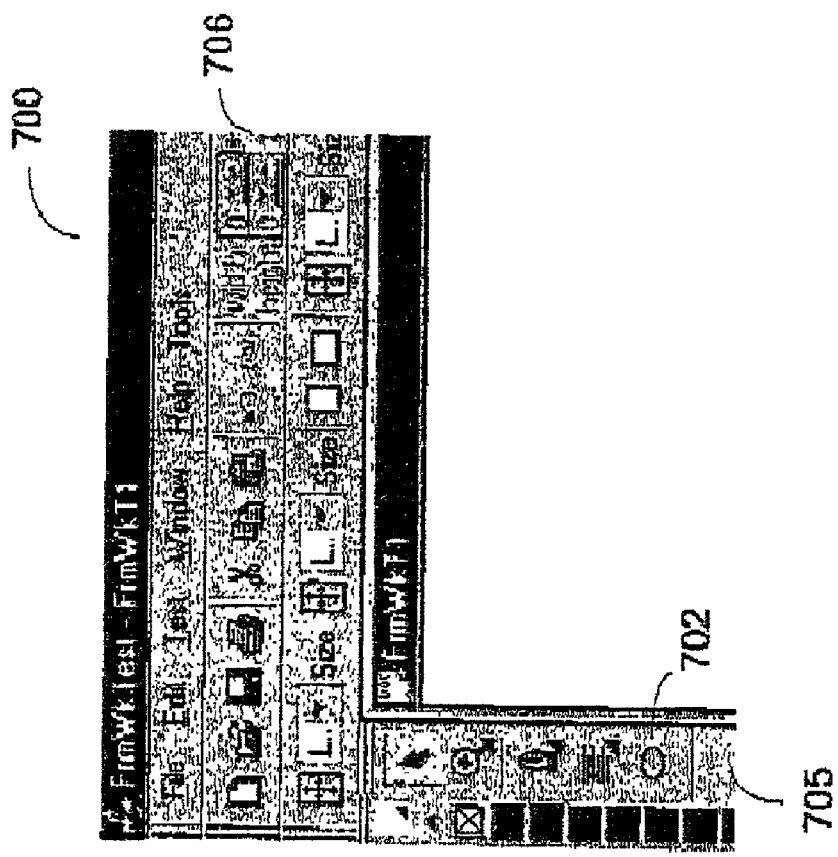
FIG. 11 is a partial screen shot showing a component has been removed.
Figure 12:
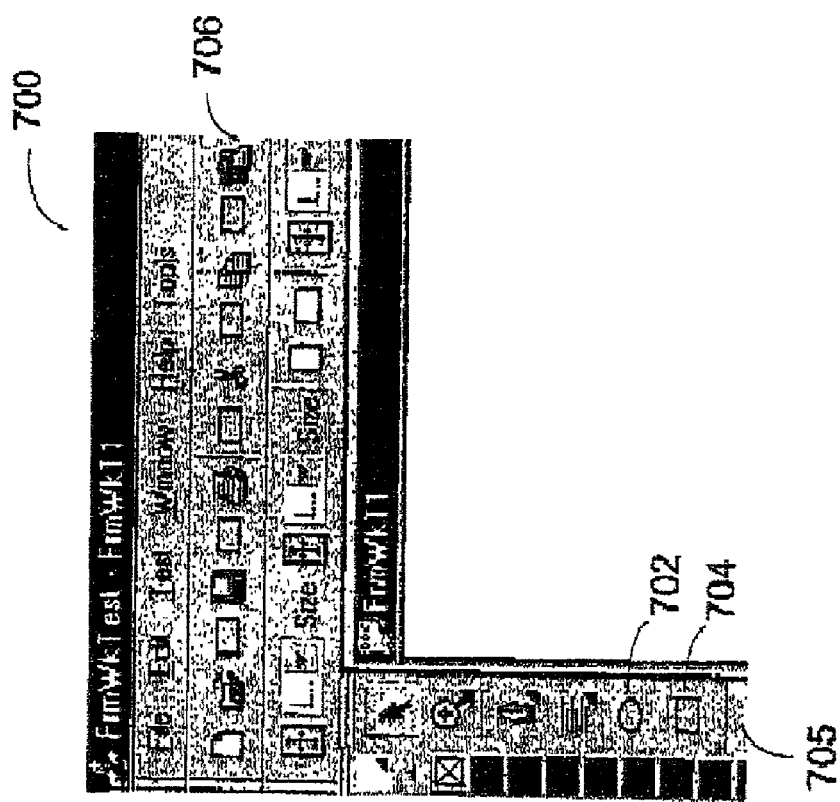
FIG. 12 is a partial screen shot showing a re-added component.

FIG. 7 shows the FrmWkTest application 700 has just loaded with the ellipse component 701 adding one ellipse button 702 to the toolbox 705 FIG. 8 shows the rectangle component 703 is now being dynamically loaded into the test application 700. FIG. 9 shows the rectangle component 703 has now loaded and has added the rectangle tool button 704 to The toolbox 705. FIG. 10 shows that the user is now free to customize the component elements 104 that have been merged into the application UI 201 just like any other application UI element 102 that has been merged into the application UI 201. In is case, the rectangle tool button 704 was copied several times onto the standard toolbar 706. If the user unloaded the rectangle component 703, all component UI elements in the merged application UI 201 that it owned would be removed including the rectangle tool button 704 in the toolbox 705 and the customized buttons 705 in the standard toolbar 706. FIG. 11 shows that if the user later launches that application 101 without the rectangle tool component 703 or shares the merged application UI 201 layout with another user who does not have the rectangle tool component 703, the rectangle tool component's 703 UI elements 704 will not appear in the second user's merged application UI 201. The customized UI elements 704 are remembered internally but not shown to the user since the component 703 to support them is not available. FIG. 12 shows that if the rectangle component 703 is later loaded, its component UI elements 704 and the customizations will appear as before.

The UI framework manager 200 has several advantages. One advantage is that the UI framework manager 200 promotes conponent UI elements 104 so that they are not given second class status but are treated equally with the rest of the application UI elements 102 with regard to content, customization and location within the merged application UI 201. This allows for components that can add significant value to an application 101.

Another advantage of the UI framework manager 200 is that by having seamless interaction between multiple component UI elements 104 and the application UI elements 102 in the merged application UI 201, the user does not feel constrained by limitations and may view the entire merged application UI 201 as a complete whole. One consistent UI approach makes the application 101 easier to use.

Another advantage of the UI framework manager 200 is that component UI elements 104 are managed by the UI rework manager 200, allowing components 103 to be loaded and unloaded with all the component UI elements 104, including those that were customized. The benefit here is that the UI framework manager 200 provides one complete solution rather than leaving it up to each individual component 103 to manage its own UI clement 104.

Another advantage of the UI framework manager 200 is that by providing a robust component UI framework manager 200, applications 101 may now rely on this technology and be shipped with various tool components 103 for different sales markets.

Another advantage of the UI framework manager 200 is that the UI framework manager 200 also allows new components 103 with their UI elements 104 to be downloaded from the Web and managed even after customers have purchased the application 101. Thus potential sales may be expanded to previous customers who just want to get the latest feature but do not want to do a full upgrade.

While specific embodiments of the present invention have been described, various modifications and substitutions may be made to such embodiments. Such modifications and substitutions are within the scope of the present invention, and are intended to be covered by the following claims.

What is claimed is:

1. A method for managing the user interface framework of a software application when installing tools in a software application, the method comprising the steps of:
   receiving a software application user interface element of the software application and a component user interface element of the component in a merged application user interface;
   merging the component user interface element with the software user interface element into the merged application user interface;
   associating the component with the component user interface element in the merged application user interface;
   allowing a plurality of users to access the merged application user interface;
   storing associations between components and users;
   providing access to shared components associated with different users; and
   hiding a shared component from users not associated with the shared component.

2. The method claimed in claim 1, wherein the merged application user interface receives a plurality of software application user interface elements.

3. The method claimed in claim 1, wherein the merged application user interface receives a plurality of component user interface elements.

4. The method claimed in claim 1, further comprising the step of disassociating the component from the component user interface element in the merged application user interface.

5. The method claimed in claim 4, further comprising the step of re-associating the component to the component user interface element in the merged application user interface.

6. The method as claimed in claim 5, further comprising the steps of:
   traversing hidden component user interface elements; and
   applying maintained customizations to the re-associated component user interface element.

7. The method as claimed in claim 4, further comprising the step of maintaining customizations to disassociated components.

8. The method as claimed in claim 4, wherein the step of disassociating includes the steps of:
   traversing merged application user interface elements; and
   hiding merged application user interface elements owned by the component.

9. The method as claimed in claim 1, wherein the step of merging is performed dynamically.

10. The method as claimed in claim 1, further comprising the step of maintaining customizations to components merged in the merged application user interface.

11. A method for managing the user interface framework of software applications when installing tools in a software application, the method comprising steps of:
    receiving a software application user interface element of a software application and a tool user interface element of a tool;
    merging the tool user interface element with the software user interface element into the merged application user interface;
    associating the tool user interface element in the merged application user interface with the tool;
    storing associations between a plurality of tools and a plurality of users;
    providing access to shared tools associated with different users;
    hiding a tool user interface element from users not associated with the tool;
    maintaining customizations to tool user interface elements merged in the merged application user interface;
    disassociating tool user interface elements in the merged application user interface;
    maintaining customizations of the disassociated tool user interface elements;
    re-associating the tool user interface elements in the merged application user interface; and
    applying maintained customizations to the re-associated tool user interface elements.

12. A user interface framework management system for managing the user interface of a software application, the user interface framework management comprising:
    a merged application user interface for receiving a software application user interface element of the software application and a component user interface element of a component to be included with the software application;
    a unification unit for merging the component user interface element with the software user interface element into the merged application user interface;
    an identification unit for associating the component with the component user interface element in the merged application user interface;
    wherein the user interface framework management system:
    stores associations between a plurality of tools and a plurality of users;
    allows a plurality of users to access the merged application user interface;
    stores associations between components and users;
    provides access to shared components associated with different users; and
    hides a shared component from users not associated with the shared component.

13. A user interface framework management system as claimed in claim 12, wherein the merged application user interface placeholder receives a plurality of software application user interface elements.

14. A user interface framework management system as claimed in claim 12, wherein the merged application user interface placeholder receives a plurality of component user interface elements.

15. A user interface framework management system as claimed in claim 12, wherein the identification unit disassociates the component from the component user interface element in the merged application user interface.

16. The user interface framework management system as claimed in claim 15, wherein the user interface framework management system maintains customizations to components associated and disassociated from the merged application user interface.

17. The user interface framework management system as claimed in claim 12, wherein the component is accessible from a plurality of user machines.

18. The user interface framework management system as claimed in claim 12, wherein a plurality of components are customized by a plurality of users, the components and their customizations accessible by users upon loading of the component into the merged application user interface.

19. The user interface framework management system as claimed in claim 18, wherein the customized component is hidden from user machines that do not have the component loaded in the merged application user interface.

20. The user interface framework management system as claimed in claim 12, wherein the component user interface elements are customizable in the merged application user interface.

21. The user interface framework management system as claimed in claim 12, wherein the component is dynamically loadable into the merged application user interface system.

22. A user interface framework management system for managing the user interface of a software application, the user interface framework management comprising:

- a merged application user interface for receiving a software application user interface element of the software application and a component user interface element of a component to be included with the software application;
- a unification unit for merging the component user interface element with the software user interface element into the merged application user interface;
- an identification unit for associating the component with the component user interface element in the merged application user interface;

wherein the user interface framework management system:

- stores associations between a plurality of tools and a plurality of users;
- provides access to shared tools associated with different users;
- hides a tool user interface element from users not associated with the tool;
- maintains customizations to tool user interface elements merged in the merged application user interface;
- disassociates tool user interface elements in the merged application user interface;
- maintains customizations of the disassociated tool user interface elements;
- re-associates the tool user interface elements in the merged application user interface; and
- applies maintained customizations to the re-associated tool user interface elements.

* * * * *

UNITED STATES PATENT AND TRADEMARK OFFICE
CERTIFICATE OF CORRECTION

PATENT NO. : 7,086,006 B2
APPLICATION NO. : 10/039486
DATED : August 1, 2006
INVENTOR(S) : Subramanian et al.

It is certified that error appears in the above-identified patent and that said Letters Patent is hereby corrected as shown below:

Col. 1, Line 20, "die" should be --the--.

Col. 1, Line 27, "uses" should be --user--.

Col. 1, Line 47, "problem" should be --problems--.

Col. 2, Line 14, "restoring" should be --restarting--.

Col. 2, Line 44, "shame" should be --share--.

Col. 2, Line 47, "The" should be --the--.

Col. 3, Line 4, "remember" should be --remembers--.

Col. 4, Line 46, "loading" should be --unloading--.

Col. 4, Line 62, "sowing" should be --showing--.

Col. 5, Line 30, "take The" should be --takes the--.

Col. 5, Line 50, "slider" should be --sliders--.

Col. 8, Line 41, "for components" should be --for complex components--.

Signed and Sealed this

Eighth Day of May, 2007

JON W. DUDAS
*Director of the United States Patent and Trademark Office*